US009377198B2

(12) United States Patent
Eastwood et al.

(10) Patent No.: US 9,377,198 B2
(45) Date of Patent: Jun. 28, 2016

(54) HEAT SHIELD FOR A COMBUSTOR

(75) Inventors: Jonathan Jeffery Eastwood, Newington, CT (US); Joey Wong, Enfield, CT (US); Robert M. Sonntag, Bolton, CT (US); Albert K. Cheung, East Hampton, CT (US); Timothy S. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1015 days.

(21) Appl. No.: 13/399,399

(22) Filed: Feb. 17, 2012

(65) Prior Publication Data

US 2013/0192233 A1 Aug. 1, 2013

Related U.S. Application Data

(60) Provisional application No. 61/592,783, filed on Jan. 31, 2012.

(51) Int. Cl.
*F23R 3/44* (2006.01)
*F23R 3/00* (2006.01)
*F23R 3/10* (2006.01)

(52) U.S. Cl.
CPC . *F23R 3/002* (2013.01); *F23R 3/10* (2013.01); *F23R 3/44* (2013.01); *F23R 2900/03044* (2013.01); *Y02T 50/675* (2013.01)

(58) Field of Classification Search
CPC ............ F23R 2900/03041; F23R 2900/03042; F23R 2900/03043; F23R 2900/03044; F23R 2900/03045; F23R 3/00; F23R 3/10; F23R 3/44; F23R 3/50
See application file for complete search history.

(56) References Cited

U.S. PATENT DOCUMENTS

| 5,129,231 A * | 7/1992 | Becker et al. ............... 60/754 |
| 5,253,471 A * | 10/1993 | Richardson ............... 60/804 |
| 5,271,219 A * | 12/1993 | Richardson ............... 60/804 |
| 5,396,759 A | 3/1995 | Richardson |
| 5,509,270 A * | 4/1996 | Pearce et al. ............... 60/740 |
| 5,623,827 A | 4/1997 | Monty |
| 5,918,467 A * | 7/1999 | Kwan ............... 60/754 |
| 5,956,955 A | 9/1999 | Schmid |

(Continued)

OTHER PUBLICATIONS

International Search Report and Written Opinion for International Application No. PCT/US2013/021416 completed on Sep. 9, 2013.

(Continued)

*Primary Examiner* — Arun Goyal
(74) *Attorney, Agent, or Firm* — Carlson, Gaskey & Olds, P.C.

(57) ABSTRACT

A heat shield includes a panel having a forward face and an aft face, a circumferential outer side and a circumferential inner side such that the panel subtends a predetermined arc, and a first radially extending side and a second radially extending side each extending from the circumferential outer side to the circumferential inner side. The panel defines an opening extending between the forward face and the aft face, a lip projecting from the forward face and extending around the opening, a rail projecting from the forward face and extending around the lip to define a cavity region between the lip and the rail, and a plurality of holes in the cavity region. Each of the plurality of holes extends from the forward face to the aft face. A region of the panel extending from the lip to the circumferential outer side is free of any aft-projecting features.

27 Claims, 4 Drawing Sheets

(56) References Cited

U.S. PATENT DOCUMENTS

| | | | |
|---|---|---|---|
| 6,298,667 B1 * | 10/2001 | Glynn et al. | 60/737 |
| 6,546,733 B2 * | 4/2003 | North et al. | 60/772 |
| 6,751,961 B2 | 6/2004 | Pacheco-Tougas et al. | |
| 7,328,582 B2 * | 2/2008 | Sandelis et al. | 60/804 |
| 7,509,813 B2 * | 3/2009 | Stastny | 60/752 |
| 7,665,306 B2 * | 2/2010 | Bronson et al. | 60/752 |
| 7,694,505 B2 | 4/2010 | Schilling | |
| 7,721,548 B2 | 5/2010 | Patel et al. | |
| 7,730,725 B2 * | 6/2010 | Faulder et al. | 60/752 |
| 7,748,221 B2 * | 7/2010 | Patel et al. | 60/756 |
| 7,992,391 B2 * | 8/2011 | Caboche et al. | 60/756 |
| 2007/0082530 A1 | 4/2007 | Burd | |
| 2009/0090110 A1 * | 4/2009 | Pardington et al. | 60/752 |

OTHER PUBLICATIONS

Gunston: "Jane's Aero-Engines," Pratt & Whitney/USA, Mar. 2000, JAEng-Issue 7, Copyright 2000 by Jane's Information Group Limited, pp. 510-512.

\* cited by examiner

HEAT SHIELD FOR A COMBUSTOR

CROSS-REFERENCE TO RELATED APPLICATION

This application claims priority to U.S. Provisional Application Ser. No. 61/592,783, filed on Jan. 31, 2012.

BACKGROUND

This disclosure relates to a combustor and, more particularly, to a heat shield for use in a combustor.

Combustors, such as those used in gas turbine engines, typically include radially spaced inner and outer liners that define an annular combustion chamber in between. A bulkhead panel is provided at a forward end of the chamber to shield a forward section of the combustor from the relatively high temperatures in the chamber. Heat shield panels are mounted on the bulkhead for further heat protection. Typically, relatively cool air from outside of the combustor is used to cool the bulkhead side of the heat shield panels. The cooling air is then dumped past the heat shield panels into the combustion chamber.

SUMMARY

A heat shield for a combustor according to an exemplary aspect of the present disclosure includes a panel having a forward face and an aft face, a circumferential outer side and a circumferential inner side such that the panel subtends a predetermined arc, and a first radially extending side and a second radially extending side each extending from the circumferential outer side to the circumferential inner side. The panel defines an opening extending between the forward face and the aft face, a lip projecting from the forward face and extending around the opening, a rail projecting from the forward face and extending around the lip to define a cavity region between the lip and the rail, and a plurality of holes in the cavity region. Each of the plurality of holes extends from the forward face to the aft face. A region of the panel that extends from the lip to the circumferential outer side is free of any aft-projecting features.

In a further non-limiting embodiment of the foregoing example, the panel is completely free of any aft-projecting features.

In a further non-limiting embodiment of any of the foregoing examples, the plurality of holes includes at least one row of holes extending adjacent the rail along the circumferential outer side.

In a further non-limiting embodiment of any of the foregoing examples, the plurality of holes includes at least one row of holes extending adjacent the rail along the circumferential inner side.

In a further non-limiting embodiment of any of the foregoing examples, the plurality of holes includes at least one row of holes extending around a periphery the lip.

In a further non-limiting embodiment of any of the foregoing examples, the plurality of holes includes a row of holes extending adjacent the rail along at least one of the circumferential outer side and the circumferential inner side, and another row of holes extending around a periphery of the lip.

In a further non-limiting embodiment of any of the foregoing examples, each of the holes of the row of holes extending around the periphery of the lip is diametrically larger than each of the holes of the row of holes extending adjacent the rail along at least one of the circumferential outer side and the circumferential inner side.

In a further non-limiting embodiment of any of the foregoing examples, the plurality of holes are of equivalent diameter.

In a further non-limiting embodiment of any of the foregoing examples, the plurality of holes includes first holes each defining a first diameter and second holes each defining a second diameter that is larger than the first diameter.

In a further non-limiting embodiment of any of the foregoing examples, the panel includes a plurality of mounting studs extending from the forward face.

In a further non-limiting embodiment of any of the foregoing examples, the panel includes a plurality of pin structures extending from the forward side in the cavity region.

In a further non-limiting embodiment of any of the foregoing examples, a portion of the plurality of holes are tapered.

In a further non-limiting embodiment of any of the foregoing examples, a portion of the plurality of holes defines respective central hole axes that are non-perpendicular to the aft face.

A further non-limiting embodiment of any of the foregoing examples includes an angle between each of the central hole axes and the aft face that is less than 80°.

In a further non-limiting embodiment of any of the foregoing examples, the angle is greater than 70°.

In a further non-limiting embodiment of any of the foregoing examples, the angle is 20-30°.

In a further non-limiting embodiment of any of the foregoing examples, the panel includes an intermediate rail projecting from the forward face and extending from the first radially extending side to the lip and from the lip to the second radially extending side.

An annular combustor according to another exemplary aspect of the present disclosure includes an annular heat shield having a forward face and an aft face, a circumferential outer side and a circumferential inner side, a plurality of openings extending between the forward face and the aft face, a plurality of lips projecting from the forward face and extending around the respective openings, a first rail adjacent the circumferential outer side and projecting from the forward face and a second rail adjacent the circumferential inner side and projecting from the forward face. The first rail and the second rail define a cavity region there between, and the annular heat shield includes a plurality of holes in the cavity region. Each of the plurality of holes extends from the forward face to the aft face, and a radial region of the annular heat shield that extends from the plurality of lips to the circumferential outer side is free of any aft-projecting features.

In a further non-limiting embodiment of the foregoing example, the annular heat shield includes a plurality of panels.

In a further non-limiting embodiment of any of the foregoing examples, each of the plurality of panels includes a first radially extending side and a second radially extending side each extending from the circumferential outer side to the circumferential inner side, and a third rail and a fourth rail each projecting from the forward face.

In a further non-limiting embodiment of any of the foregoing examples, the annular combustor includes an annular outer shell and an annular inner shell radially inwardly spaced from the annular outer shell to define an annular combustion chamber there between. An annular hood is secured to the annular outer shell and the annular inner shell. A bulkhead is located between the annular combustion chamber and the annular hood, and the annular heat shield is mounted in the annular combustion chamber on the bulkhead.

In a further non-limiting embodiment of the foregoing example, the bulkhead includes impingement openings in communication with the cavity region of the annular heat shield.

A gas turbine engine according to an exemplary aspect of the present disclosure includes a compressor section, a annular combustor in fluid communication with the compressor section, and a turbine section in fluid communication with the annular combustor. The annular combustor is as described in any of the foregoing examples.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
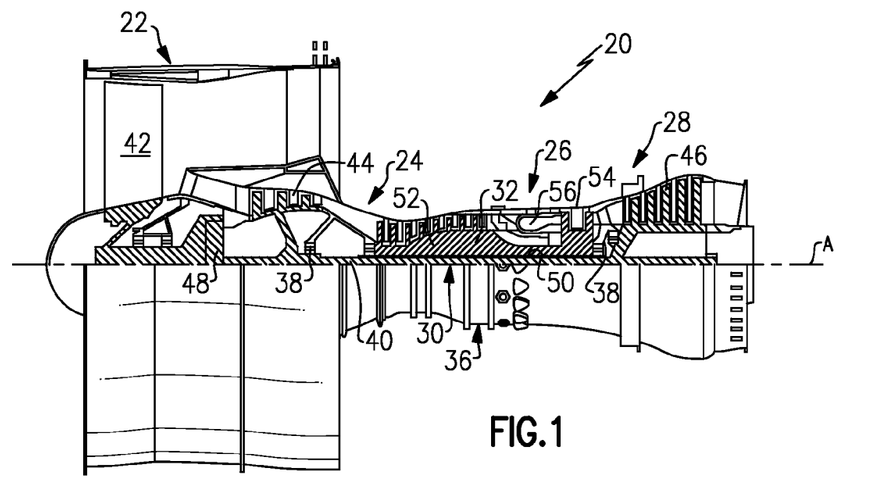
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of [(Tambient degree Rankine)/518.7)^0.5]. The "Low corrected fan tip speed" as disclosed herein according to one non-limiting embodiment is less than about 1150 feet per second.

Figure 2:
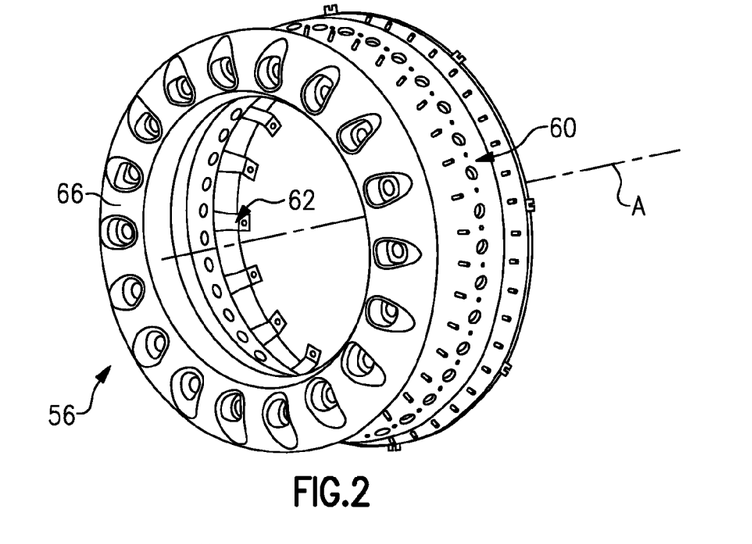
FIG. 2 illustrates a perspective view of an annular combustor of the engine.
Figure 3:
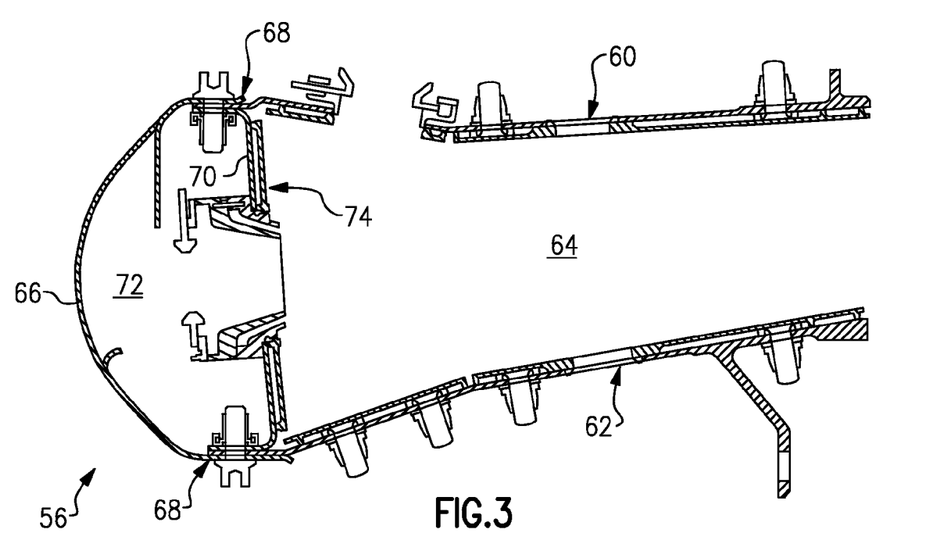
FIG. 3 illustrates a cross section of the annular combustor taken along the section line shown in FIG. 2.

FIG. 2 illustrates a perspective view of one example of the annular combustor 56 and FIG. 3 illustrates a cross-section through the annular combustor 56. In this example, the annular combustor 56 includes an outer annular shell 60 and an inner annular shell 62 spaced radially inward of the outer shell 60 thus defining an annular combustion chamber 64 there between. An annular hood 66 is positioned axially forward (toward the front of the gas turbine engine 20) of the annular shells 60, 62 and spans between and sealably connects to forward ends of the outer annular shells 60, 62. It is to be understood that relative positional terms, such as "forward," "aft," "upper," "lower," "above," "below," and the like are relative to the normal operational attitude of the gas turbine engine 20 and should not be considered otherwise limiting.

In this example, the annular hood 66 secures to the annular shells 60, 62 at respective joints 68. A bulkhead 70 divides the annular combustion chamber 64 and a hood chamber 72. An annular heat shield 74 is mounted on a combustion chamber side (i.e. downstream side) of the bulkhead 70 and generally serves to thermally protect the bulkhead 70 and forward portion of the annular combustor 56, such as the hood chamber 72.

Figure 4A:
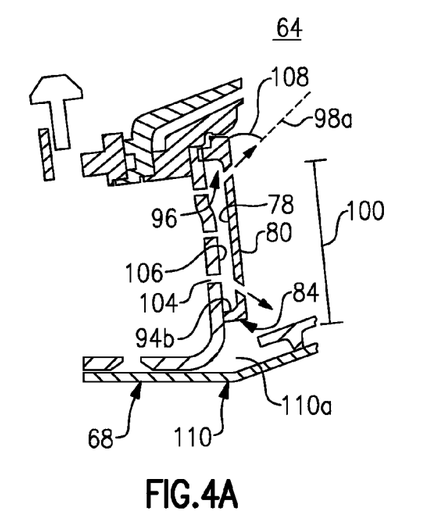
FIG. 4A illustrates a cross section of a heat shield in the combustor.
Figure 4B:
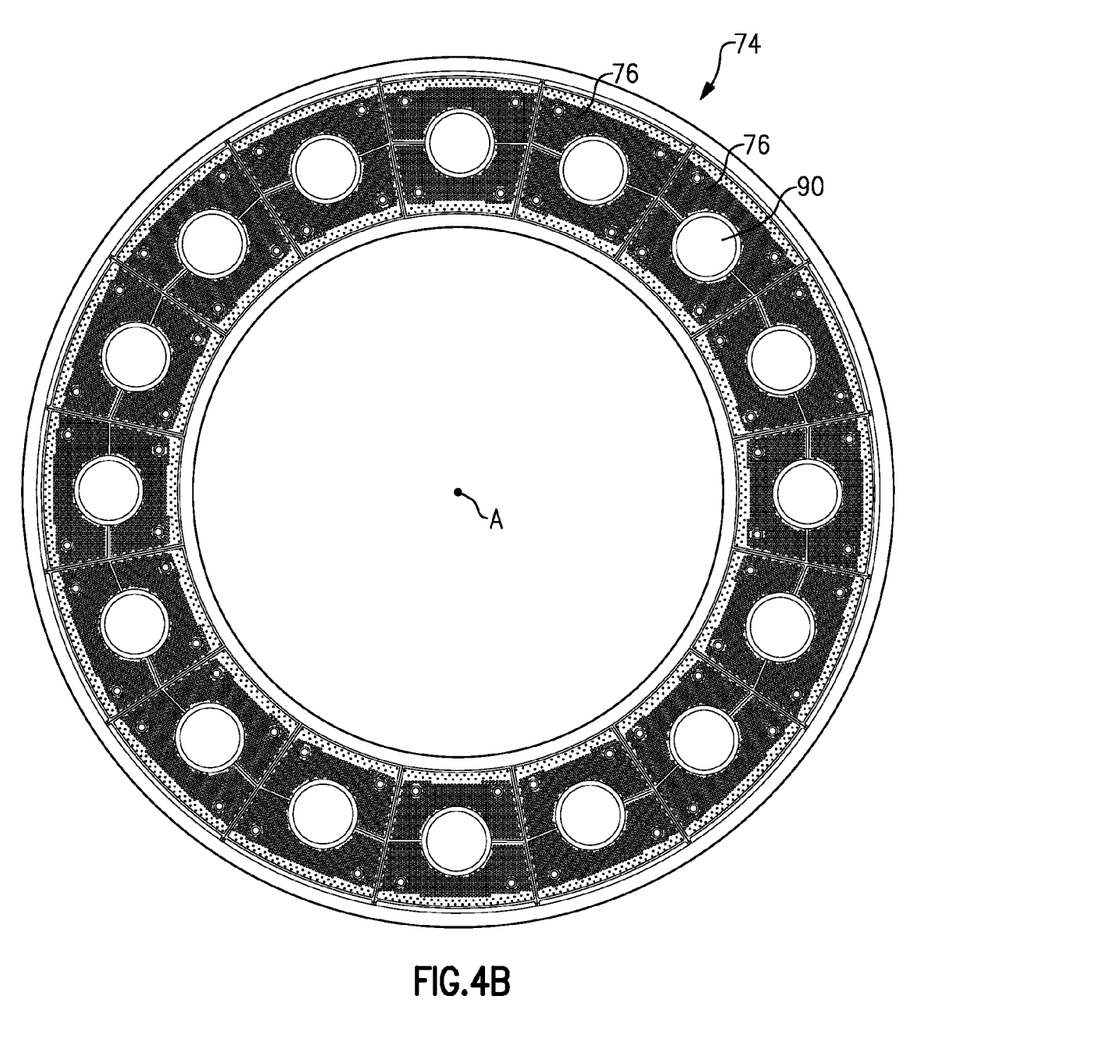
FIG. 4B illustrates a plan view of a heat shield in the combustor.
Figure 5A:
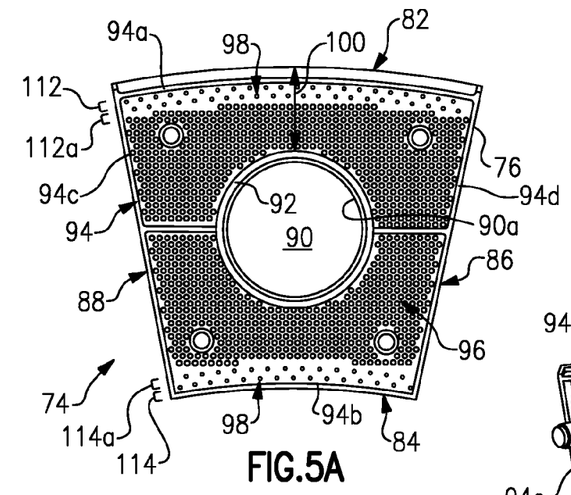
FIG. 5A illustrates a plan view of a panel of a heat shield used in the combustor.
Figure 5B:
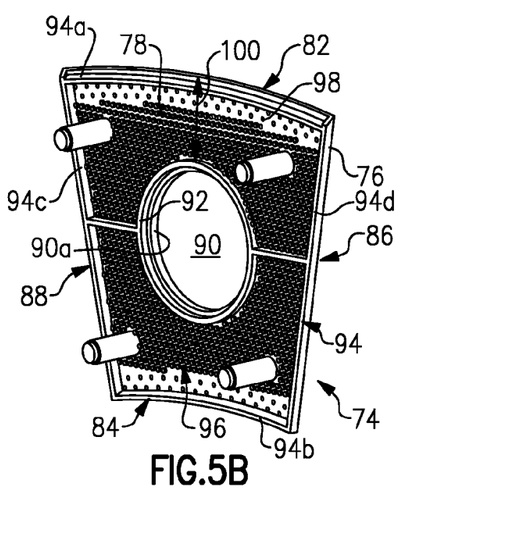
FIG. 5B illustrates a perspective view of the panel of FIG. 5A.

Referring also to an enlarged cross section of the bulkhead 70 shown in FIG. 4A and an isolated view of the annular heat shield 74 in FIG. 4B, the annular heat shield 74 includes a plurality of panels 76 (shown in isolated view in FIGS. 5A and 5B). Each of the panels 76 carries a forward face 78 and an opposite aft face 80, a circumferential outer side 82 and a circumferential inner side 84 that subtend a predetermined arc with regard to the circumference of the annular heat shield 74, and a first radially extending side 86 and a second radially extending side 88 that each extend from the circumferential outer side 82 to the circumferential inner side 84 (FIGS. 5A and 5B). In one example, the forward face 78 is a surface of a thermal barrier coating. Each panel 76 further includes an opening 90 that extends between the forward face 78 and the aft face 80. The opening 90 receives a mixture of fuel and air for combustion in the combustion chamber 64. A continuous lip 92 projects forward from the forward face 78 and fully extends around a periphery 90a of the opening 90. In this example, the 92 lip has an interference fit with an indent in the bulkhead 70 under all tolerance conditions.

A rail 94 projects from the forward face 78 and fully extends around the lip 92 to define a cavity region 96 between the lip 92 and the rail 94; and, further defined axially between the forward face 78 of the panel 76 and the bulkhead 70. The rail 94 makes line-on-line contact with the bulkhead 70 under nominal tolerances. In this example, the rail 94 includes a first rail 94a adjacent the circumferential outer side 82, a second rail 94b adjacent the circumferential inner side 84, and a third rail 94c and a fourth rail 94d adjacent the respective first radially extending side 86 and the second radially extending side 88. The third rail 94c and the fourth rail 94d may be excluded if the heat shield 74 is a unitary annular structure instead of a structure that is sectioned into the panels 76.

A plurality of holes 98 extend through the panel 76 in the cavity region 96 each extend from the forward face 78 to the aft face 80. For example, the holes 98 are formed using laser drilling or electrical discharge machining but are not limited to these techniques. The panel 76 of the annular heat shield 74 includes a region 100 that extends from the lip 92 to the circumferential outer side 82. The region 100 is free of any aft-projecting features. That is, in the region 100 the panel 76 does not include any projections, such as flanges, lips, rails or the like, which extend in an aft direction into the annular combustion chamber 64. In the illustrated example, the aft face 80 of the panel 76 is completely free of any aft-projecting features to enhance flow management in the annular combustion chamber 64. However, in other examples, regions of the panel 76 outside of the region 100 can optionally include aft-projecting features.

In operation of the annular combustor 56, fuel is provided through a nozzle (not shown) that extends through a swirler 102, which extends through the opening 90 of the annular heat shield 74. The annular heat shield 74 protects the bulkhead 70 and the forward section of the annular combustor 56 from the relatively high temperatures in the annular combustion chamber 64. To cool the annular heat shield 74, relatively cool air from outside of the annular combustor 56 is provided to the forward face 78 of the annular heat shield 74. As an example, cooling air is provided from the hood chamber 72 to the forward face 78 of the bulkhead 70.

Referring to FIG. 4, at least a portion of the cooling air is emitted through impingement openings 104 in the bulkhead 70 onto the forward face 78 of the annular heat shield 74. The rails 94 and the lip 92 of the annular heat shield 74 enclose, and thus seal, the cavity region 96 against an aft face 106 of the bulkhead 70. In that regard, the rails 94 and lip 92 sufficiently project forward to contact the aft face 106 of the bulkhead 70 such that the rails 94 on four sides and circular lip 92 form the cavity region 96. Thus, the cooling air provided is sealed in the cavity region 96 and can only escape through the plurality of holes 98 in the annular heat shield 74. The cooling air flows through the plurality of holes 98 to facilitate cooling the aft face 80 of the annular heat shield 74. In general, all of the holes 98 are of identical diameter. In other examples, some of the holes 98 are larger for greater cooling flow in target locations. In further examples, the holes 98 have diameters of 1-1000 micrometers, 100-800 micrometers or 500-800 micrometers.

The holes 98 each define a central axis 98a. Each central axis 98a includes an angle 108 (FIG. 4) with the aft face 80 of the annular heat shield 74. In one example, the central axes 98a each form a non-perpendicular angle with the aft face 80 of the annular heat shield 74. In one example, the angle 108 is less than 80°. In a further example, the angle 108 is 70-80° or 75°. In a further example, the angle 108 is 20-30°. In another example, the plurality of holes 98 have various angles that are less than 80°, such as some angles that are 70-80° and other angles that are 20-30°.

The angle 108 of each of the axes 98a depends upon the location of the corresponding hole 98 on the annular heat shield 74. For example, holes 98 that are near the circumferential outer side 82 are angled radially outward toward the annular outer shell 60 of the annular combustor 56. Holes 98 that are near the circumferential inner side 84 are angled toward the annular inner shell 62. Holes 98 that are near the lip 92 may be angled toward a central axis of the opening 90. In one example, the central axes 98a of the holes 98 that are near the circumferential outer side 82 have an angle 108 of 70-80° and the central axes 98a of the holes 98 that are near the circumferential inner side 84 have an angle 108 of 20-30°.

Utilizing the region 100 that is free of any aft-projecting features in combination with the angled holes 98 allows the cooling air emitted from the holes 98 to be jetted radially outwardly or radially inwardly to cool corner sections 110 of the annular combustor 56. As an example, the corner sections 110 include respective passages 110a that permit fluid communication between the annular combustion chamber 64 and the respective joints 68. By utilizing the region 100 that is free of any aft-projecting features, the cooling air emitted through the angled holes 98 can be radially projected toward the corner sections 110 to provide an "air curtain" that protects the corner section 110 from the relatively high temperatures generated in the annular combustion chamber 64. In comparison, utilizing one or more aft-projecting features in the region 100 or on the annular heat shield 74 would block or redirect the cooling air to a location that is farther downstream and thus be less effective for providing the protective air curtain.

FIGS. 5A and 5B show isolated views of the annular heat shield 74. In this example, the annular heat shield 74 includes at least one row 112 of holes 98 that extend adjacent the rail 94 along the circumferential outer side 82. As also shown, a row 112a of holes is provided at a radially inwardly spaced location from the row 112 and is circumferentially offset with regard to the row 112. Additionally, or alternatively to the at least one row 112, 112a, the annular heat shield 74 includes at least one row 114 of holes 98 that extend adjacent the rail 94 at the circumferential inner side 84. An additional row 114a may be provided radially outwardly from the row 114. In this example, the row 114a is circumferentially offset from the row 114. It is to be understood that the rows 112, 112a, 114 and 114a may be used individually or in any combination thereof.

Figure 6:
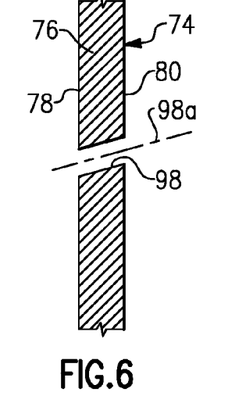
FIG. 6 illustrates a cross section through a heat shield showing a hole.

FIG. 6 illustrates an isolated view of one of the holes 98 through the panel 76 of the annular heat shield 74. In this example, the diameter of the hole 98 is uniform from the forward face 78 to the aft face 80.

Figure 7:
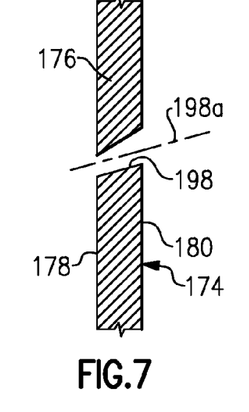
FIG. 7 illustrates a cross section through another example heat shield at a tapered hole.

FIG. 7 illustrates a view of a modified panel 174 of an annular heat shield 174. In this disclosure, like reference numerals designate like elements where appropriate, and reference numerals with the addition of one-hundred or multiples thereof designate modified elements that are understood to incorporate the same features and benefits of the corresponding elements. In this example, the annular heat shield 174 includes a plurality of holes 198 (one shown) that extend from the forward face 178 through the panel 176 to the aft face 180. As shown, the hole 198 is tapered such that the hole 198 at the forward face 178 has a smaller diameter than at the aft face 180.

Figure 8:
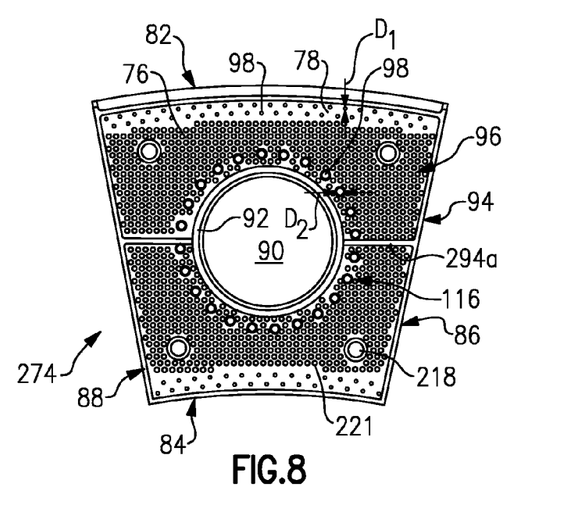
FIG. 8 illustrates a plan view similar to FIG. 5A but of another example panel of a heat shield.

FIG. 8 illustrates another example annular heat shield 274 that is similar to the annular heat shield 74 of FIG. 5A. However, in this example, additional holes 98 are provided in a circumferential row 116 that extends around a periphery of the lip 92. The circumferential row 116 may be used alone as the only holes 98 in the annular heat shield 274 or in combination with one or more of the rows 112, 112a, 114 and 114a as previously described. It is to be understood that additional holes 98 may also be provided in the panel 76.

Additionally, the annular heat shield 274 also optionally includes an intermediate rail 294a that projects from the forward face 78 and extends from the first radially extending side 86 to the lip 92 and from the lip 92 to the second radially extending side 88. Thus, the intermediate rail 294a divides the cavity region 96 into a radially outer cavity and a radially inner cavity.

In operation, the intermediate rail 294a facilitates directing the cooling air to particular ones of the holes 98. For example, cooling air provided into the radially inner portion of the cavity region 96 is thereby forced through any of the holes 98 in that region. Alternatively, cooling air provided into the radially outer portion of the cavity region 96 is thereby forced through any of the holes 98 in that region. Further intermediate rails 94a may also be provided, depending upon the desire to provide cooling air to particular ones of the holes 98.

The annular heat shield 274 also includes optional mounting studs 218 that project from the forward face 78. The mounting studs 218 facilitate mounting the annular heat shield 274 to the bulkhead 70. Additionally, the annular heat shield 274 may include a plurality of pin structures 221 that project from the forward face 78 in the cavity region 96. The pin structures 221 facilitate turbulence of the cooling air and provide greater surface area for heat transfer thus improved cooling.

In a further example, the plurality of holes 98 include first holes that have a first diameter D1 and second holes that each have a second diameter D2 that is different than the first diameter. For example, the diameters D2 of the holes 98 in the circumferential row 116 are larger than the diameters D1 of the holes 98 elsewhere in the annular heat shield 274. The difference in the sizes of the diameters of the holes 98 facilitates the control of cooling air emitted through the annular heat shield 274. Thus, larger holes may be provided where a greater cooling affect is desired and smaller holes may be provided where less cooling is desired.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A heat shield for a combustor, comprising:
a panel including a forward face and an aft face, a circumferential outer side and a circumferential inner side such that the panel subtends a predetermined arc, and a first radially extending side and a second radially extending side each extending from the circumferential outer side to the circumferential inner side, the circumferential outer side facing radially outwards and the circumferential inner side facing radially inwards,
the panel defining an opening extending between the forward face and the aft face, a lip projecting from the forward face and extending around the opening, a rail projecting from the forward face adjacent to a periphery of the panel and substantially enclosing the lip to define a cavity region between the lip and the rail, and a plurality of holes in the cavity region, each of the plurality of holes extending from the forward face to the aft face, wherein a portion of the holes located toward the circumferential outer side are sloped radially outwards from the forward face to the aft face at an angle of less than 80° with respect to the aft face to provide an air curtain thermally protecting the circumferential outer side, and
a region of the panel extending from the lip to the circumferential outer side is free of any aft-projecting features.

2. The heat shield as recited in claim 1, wherein the panel is completely free of any aft-projecting features.

3. The heat shield as recited in claim 1, wherein the plurality of holes include at least one row of holes extending adjacent the rail along the circumferential outer side.

4. The heat shield as recited in claim 1, wherein the plurality of holes include at least one row of holes extending adjacent the rail along the circumferential inner side.

5. The heat shield as recited in claim 1, wherein the plurality of holes include at least one row of holes extending around a periphery the lip.

6. The heat shield as recited in claim 1, wherein the plurality of holes includes a row of holes extending adjacent the rail along at least one of the circumferential outer side and the circumferential inner side, and another row of holes extending around a periphery of the lip.

7. The heat shield as recited in claim 6, wherein each of the holes of the row of holes extending around the periphery of the lip is diametrically larger than each of the holes of the row of holes extending adjacent the rail along at least one of the circumferential outer side and the circumferential inner side.

8. The heat shield as recited in claim 1, wherein the plurality of holes includes first holes each defining a first diameter and second holes each defining a second diameter that is larger than the first diameter.

9. The heat shield as recited in claim 1, wherein the panel includes a plurality of mounting studs extending from the forward face.

10. The heat shield as recited in claim 1, wherein the panel includes a plurality of pin structures extending from the forward side in the cavity region.

11. The heat shield as recited in claim 1, wherein at least a portion of the plurality of holes are tapered.

12. The heat shield as recited in claim 1, wherein the angle is greater than 70°.

13. The heat shield as recited in claim 1, wherein the angle is 20-30°.

14. The heat shield as recited in claim 1, wherein the panel includes an intermediate rail projecting from the forward face and extending from the first radially extending side to the lip and from the lip to the second radially extending side.

15. The heat shield as recited in claim 1, wherein another portion of the holes, which are located radially inboard of the holes that are sloped radially outwards, are sloped radially inwards from the forward face to the aft face.

16. The heat shield as recited in claim 1, wherein the plurality of holes includes multiple rows of holes extending adjacent the rail along the circumferential outer side, multiple rows of holes extending adjacent the rail along the circumferential inner side, and a circumferential row of holes extending around the lip, wherein the holes of the circumferential row are diametrically larger than the holes of the multiple rows of holes extending adjacent the rail along the circumferential outer side and the holes of the multiple rows of holes extending adjacent the rail along the circumferential inner side.

17. The heat shield as recited in claim 16, wherein the plurality of holes includes additional multiple rows of holes located between the circumferential row of holes and the multiple rows of holes extending adjacent the rail along the circumferential outer side, and additional multiple rows of holes located between the circumferential row of holes and the multiple rows of holes extending adjacent the rail along the circumferential inner side.

18. A an annular combustor, comprising:
an annular heat shield including a plurality of panels, each of the plurality of panels including a forward face and an aft face, a circumferential outer side and a circumferential inner side, the circumferential outer side facing radially outwards and the circumferential inner side facing radially inwards, each of the plurality of panels defining an opening extending between the forward face and the aft face, a lip projecting from the forward face and extending around the opening, rail projecting from the forward face adjacent to a periphery of each of the plurality of panels and substantially enclosing the lip to define a cavity region between the lip and the rail, and a plurality of holes in the cavity region, each of the plurality of holes extending from the forward face to the aft face, a portion of the holes located toward the circumferential outer side are sloped radially outwards from the forward face to the aft face at an angle of less than 80° with respect to the aft face to provide an air curtain thermally protecting the circumferential outer side, and a radial region of the annular heat shield extending from the plurality of lips to the circumferential outer side is free of any aft-projecting features.

19. The annular combustor as recited in claim 18, wherein each of the plurality of panels includes a first radially extending side and a second radially extending side each extending from the circumferential outer side to the circumferential inner side, a third rail and a fourth rail each projecting from the forward face.

20. The annular combustor as recited in claim 18, including an annular outer shell and an annular inner shell radially inwardly spaced from the annular outer shell to define an annular combustion chamber there between, an annular hood secured to the annular outer shell and the annular inner shell, a bulkhead between the annular combustion chamber and the annular hood, and the annular heat shield is mounted in the annular combustion chamber on the bulkhead.

21. The annular combustor as recited in claim 20, wherein the bulkhead includes impingement openings in communication with the cavity region of the annular heat shield.

22. The annular combustor as recited in claim 18, wherein another portion of the holes, which is located radially inboard of the holes that are sloped radially outwards, is sloped radially inwards from the forward face to the aft face.

23. A gas turbine engine comprising:
a compressor section;
an annular combustor in fluid communication with the compressor section; and
a turbine section in fluid communication with the annular combustor, the annular combustor including an annular outer shell and an annular inner shell radially inwardly spaced from the annular outer shell to define an annular combustion chamber there between, an annular hood secured to the annular outer shell and the annular inner shell, a bulkhead secured to the annular combustion chamber and the annular hood, and an annular heat shield mounted in the combustion chamber on the bulkhead, the annular heat shield including:
a plurality of panels, each of the plurality of panels including a forward face and an aft face, a circumferential outer side and a circumferential inner side, the circumferential outer side facing radially outwards and the circumferential inner side facing radially inwards, an opening extending between the forward face and the aft face, a lip projecting from the forward face and extending around the opening, a rail projecting from the forward face adjacent to a periphery of the plurality of panels and substantially enclosing the lip to define a cavity region between the lip and the rail, and a plurality of holes in the cavity region, each of the plurality of holes extending from the forward face to the aft face, a portion of the holes located toward the circumferential outer side are sloped radially outwards from the forward face to the aft face at an angle of less than 80° with respect to the aft face to provide an air curtain thermally protecting the circumferential outer side, and a radial region of the annular heat shield extending from the plurality of lips to the circumferential outer side is free of any aft-projecting features.

24. The heat shield as recited in claim 1, wherein the circumferential outer side is a radially outermost side of the panel.

25. The annular combustor as recited in claim 18, wherein the circumferential outer side is a radially outermost side of the panel.

26. The gas turbine engine as recited in claim 23, wherein the circumferential outer side is a radially outermost side of the panel.

27. The gas turbine engine as recited in claim 23, wherein another portion of the holes, which is located radially inboard of the holes that are sloped radially outwards, is sloped radially inwards from the forward face to the aft face.

* * * * *